United States Patent

Keskitalo et al.

Patent Number: 5,930,684
Date of Patent: Jul. 27, 1999

[54] METHOD FOR TRANSMITTING CALLS OF DIFFERENT PRIORITIES WHICH ARE ASSOCIATED WITH DIFFERENT POWER LEVELS IN A CELLULAR NETWORK

[75] Inventors: Ilkka Keskitalo, Oulu; Arto Kiema, Salo; Jari Savusalo, Oulu; Petri Jolma, Oulu; Juha Särkioja, Oulu, all of Finland

[73] Assignee: Nokia Telecommunications Oy, Espoo, Finland

[21] Appl. No.: 08/696,861

[22] PCT Filed: Feb. 17, 1996

[86] PCT No.: PCT/FI95/00082

§ 371 Date: Aug. 19, 1995

§ 102(e) Date: Aug. 19, 1996

[87] PCT Pub. No.: WO95/24102

PCT Pub. Date: Sep. 8, 1995

[30] Foreign Application Priority Data

Feb. 25, 1994 [FI] Finland ................................ 940929

[51] Int. Cl.[6] .............................. H04B 1/00; H04B 7/00; H04B 7/185
[52] U.S. Cl. ........................ 455/69; 455/13.4; 455/522; 455/453
[58] Field of Search ........................... 455/69, 13.4, 522, 455/512, 404, 450, 451, 452, 453, 454, 455; 370/342, 347, 395, 396, 397, 409

[56] References Cited

U.S. PATENT DOCUMENTS

| | | | |
|---|---|---|---|
| 4,882,766 | 11/1989 | Akaiwa | 455/58 |
| 5,396,649 | 3/1995 | Hamabe | 455/34.1 |
| 5,442,807 | 8/1995 | Takayama | 455/33.1 |
| 5,448,750 | 9/1995 | Eriksson et al. | 455/33.1 |
| 5,448,751 | 9/1995 | Takenaka et al. | 455/33.1 |
| 5,666,654 | 9/1997 | Kanai | 455/512 |

FOREIGN PATENT DOCUMENTS

| | | |
|---|---|---|
| 515 335 | 11/1992 | European Pat. Off. . |
| 631 397 | 12/1994 | European Pat. Off. . |
| 93/07702 | 4/1993 | WIPO . |
| 93/17531 | 9/1993 | WIPO . |
| 94/00927 | 1/1994 | WIPO . |

OTHER PUBLICATIONS

Hsu, Cherng–Shung et al., Multilevel Priority Scheme for Fiber–Optic Code Division Multiple Access (CDMA) Packet Networks, IEEE, pp. 1359–1366, 1993.

*Primary Examiner*—Douglas W. Olms
*Assistant Examiner*—David R Vincent
*Attorney, Agent, or Firm*—IP Group of Pillsbury Madison & Sutro LLP

[57] ABSTRACT

The invention relates to a method for transmitting calls of different priorities in a cellular network which comprises in each cell at least one base station (10) communicating with subscriber terminals (11a–11d, 13) within its area, and in which network the base station transmits power control information to the terminal equipments, which may adjust their transmit power on the basis of the power control messages from the base station, the calls of the network having different levels of priority. In order to ensure the call establishment and the quality of calls with a high priority, the calls with a high priority use a higher transmit power than what is allowed for calls with a lower priority.

9 Claims, 1 Drawing Sheet

METHOD FOR TRANSMITTING CALLS OF DIFFERENT PRIORITIES WHICH ARE ASSOCIATED WITH DIFFERENT POWER LEVELS IN A CELLULAR NETWORK

This application claims benefit of International application PCT/FI95/00082, filed Feb. 17, 1995.

1. Field of the Invention

The invention relates to a method for transmitting calls of different priorities in a cellular network which comprises in each cell at least one base station communicating with subscriber terminals within its area, and in which network the base station transmits power control information to the terminal equipments, which may adjust their transmit power on the basis of the power control messages from the base station, the calls of the network having different levels of priority.

2. Background

In conventional data transmission systems where call establishment is guaranteed, all calls are of equal value. In transmission systems, such as in cellular networks, where a terminal equipment must compete to have a channel for itself, there is often a need to guarantee a greater chance for important calls to have a connection than for so-called normal calls. This is realized in such a way that some call types or some users have been granted a higher priority in receiving a channel than others. Such prioritized calls or users may be emergency calls, the police, other authorities or a subscriber who has acquired a right to priority.

In present mobile phone systems, prioritized calls are indicated by means of information connected to signaling. When a user has wanted to make a prioritized call, he has indicated it in some manner enabled by the user interface of the terminal equipment, for example by means of a code or by calling some number, such as the general emergency number, the calls intended for which may have been automatically classified as prioritized calls in the mobile phone system.

In the call-establishment stage, the terminal equipment signals to the base station that the call is prioritized, and the base station treats the call after that in a manner defined separately in each system. In the present system, prioritized calls do not have, however, any priorities over the other calls with respect to the power control.

Especially in mobile phone systems applying the CDMA multiple access method, the transmit power of the terminal equipments is controlled from the base station in such a way that the base station receives the signals from the different terminal equipments with the same strength as accurately as possible. The purpose of this is to maximize the capacity of the system. In a case of overloading, the quality of all calls deteriorates in the same way, and the probability that calls near the cell border are disconnected increases, and so does the likelihood of incoming calls being blocked. Prioritized calls realized with the present methods have the same probability of being disconnected as normal calls.

SUMMARY OF THE INVENTION

The purpose of the present invention is to maintain a better quality and reliability for prioritized calls than what has previously been possible and to improve the probability of their call establishment also in cases of overloading.

This is achieved with the method disclosed in the preamble which is characterized in that calls with a high priority use a higher transmit power than what is allowed for calls with a lower priority.

Accordingly, in one aspect, this invention is a method for transmitting calls of different priorities in a cellular network which comprises in each cell at least one base station communicating with subscriber terminals within its area, and in which network the base station transmits power control information messages to the terminals, which may adjust their transmit power on the basis of the power control information messages from the base station, the calls of the network having different levels of priority. The invention is characterized in that calls with a high priority use a higher transmit power than what is allowed for calls with a lower priority.

In some embodiments, the power control information messages transmitted by the base station to the terminal equipment take into account the priority level of the call in such a way that a higher transmit power is used in calls with a high priority than in calls with a lower priority in similar circumstances.

In some embodiments, the mobile station signals to the base station a value differing from the real value of the transmit power it uses in a call with a higher priority, the base station transmitting a power control command to the mobile station on the basis of this differing value, and that the mobile station uses a higher transmit power than the power control messages transmitted by the base station to the terminal equipment indicate.

In some embodiments, when a call set-up message for a prioritized call is transmitted, a higher transmit power is used than in other calls.

In some embodiments, when a call set-up message for a prioritized call is transmitted, the transmit power value indicated by the open loop power control is used, increased by a determined constant value.

In some embodiments, when the call is established, the mobile station signals to the base station that it will start a prioritized call. In some embodiments, if the power of the signal received by the base station from a mobile station having a prioritized call drops below a predetermined threshold, a higher transmit power is used in the prioritized call than in he other calls.

In some other embodiments, the level of the transmit power used in the prioritized call depends on the power control commands transmitted by the base station and on the traffic load of the cell.

In another aspect of this invention the level of the transmit power used in the prioritized call depends on the level of priority of the call.

Sometimes the transmit power used in the prioritized call varies during the call.

In some embodiments, the cellular network employs a CDMA multiple access method.

DETAILED DESCRIPTION OF THE DRAWINGS

Figure 1:
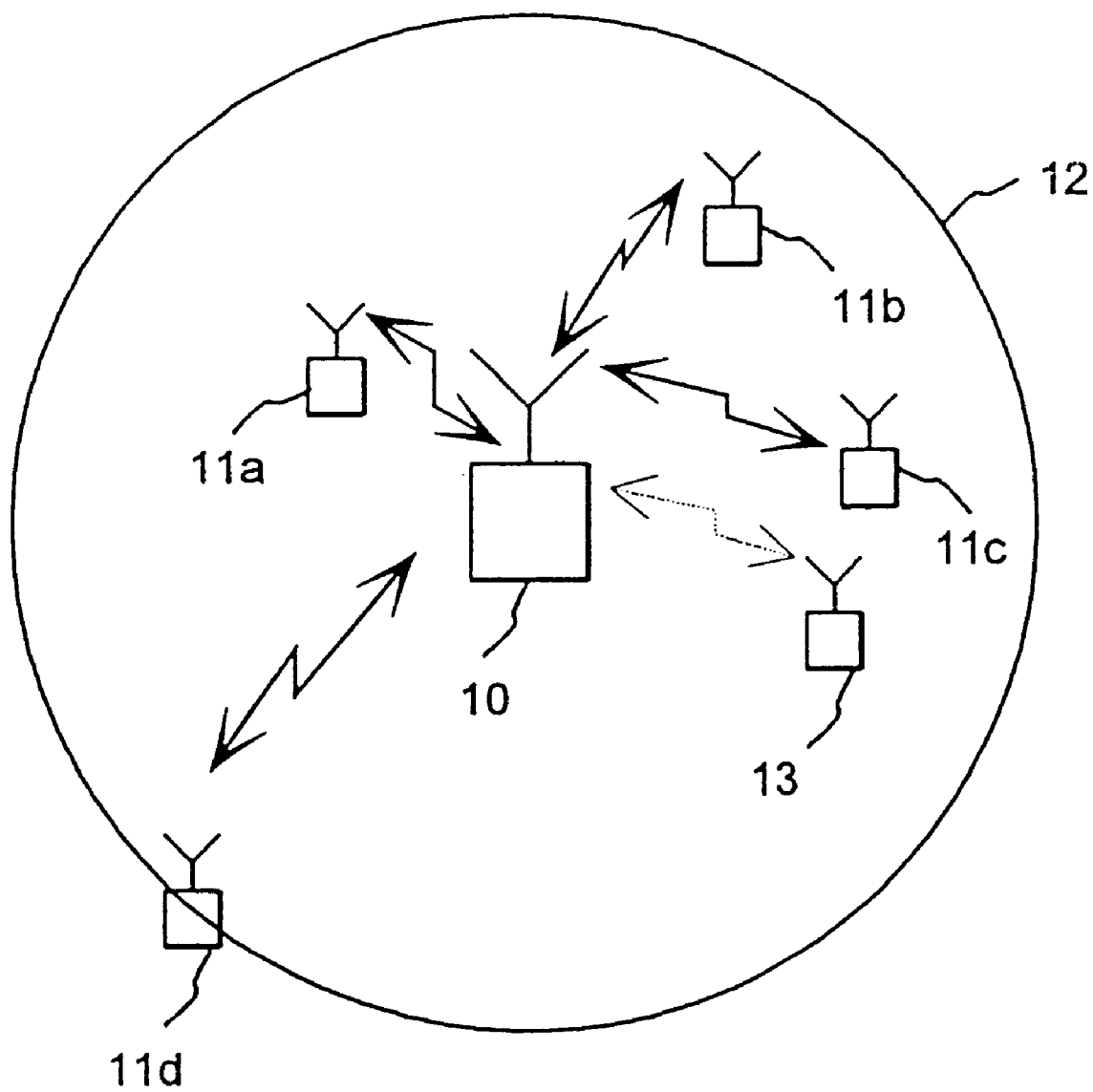

In the following, the invention will be described in greater detail with reference to the examples according to the accompanying drawing, in which FIG. 1 shows a part of a cellular network system where the method according to the invention can be applied.

DETAILED DESCRIPTION OF THE PRESENTLY PREFERRED EXEMPLARY EMBODIMENTS

The method according to the invention can be applied in different ways in cellular network systems applying both the FDMA, TDMA, and in particular CDMA multiple access method. In the following, the invention will be described first in connection with applying it in a CDMA cellular network.

CDMA is a multiple access method, which is based on the spread spectrum technique and which has been applied recently in cellular radio systems due to its advantages, such as spectral efficiency and the simplicity of frequency planning.

In CDMA, several users transmit on the same wide frequency band, and the users are distinguished from one another on the basis of a spreading code characteristic of each user. The spreading code is a pseudo random code sequence which has a considerably broader band than the data signal of the user, and by which the user data is multiplied. In the reception, the signal is correspondingly multiplied by the same spreading sequence, and as a result the original data signal is obtained. Signals transmitted with other spreading codes appear as noise in the reception.

In a CDMA cellular system, a base station continuously monitors the transmit power of the terminal equipments in its area and controls the power of each terminal equipment by transmitting power control commands to the terminal equipment. The object is that the signal of each terminal equipment is received at the base station with exactly the same power. This is necessary for the maximization of the capacity of the cell. Since all terminal equipments use the same frequency band, equipments transmitting with a higher power might interfere with the audibility of the other equipments. The transmit power varies continuously depending on the attenuation over the connection between the base station and each terminal equipment, and on the traffic load of the cell. The attenuation over the connection depends, for example, on the distance between the terminal equipment and the base station.

When the traffic load of the cell increases, the quality of the connection of each terminal equipment deteriorates equally. Near the cell border, where terminal equipments often transmit with a high power, the probability of a call being disconnected grows, since when the disturbance increases, the terminal equipments are not allowed to raise their power. The establishment of new calls also becomes more difficult.

In the method according to the invention, a subscriber with a high priority may use a higher transmit power than a subscriber which is situated at the same distance from the base station but which has a lower priority.

The situation is illustrated in FIG. 1, where a base station 10 communicates with the terminal equipments 11a to 11d within its service area 12, each terminal equipment presently having a call of a normal level of priority. The base station adjusts the power of each terminal equipment in such a way that it receives the signal from each terminal equipment with the same power level regardless of how far each terminal equipment is from the base station. Thus, for example terminal equipment 11d situated far from the base station probably transmits with a higher power than terminal equipment 11a which is very close to the base station.

Assume that a terminal equipment 13 starts a call with a high priority, for example an emergency call. On the basis of the signaling of the base station on the general signaling channel, the terminal equipment knows what kind of transmit power it should use in a call set-up message for a normal call. However, since the call is prioritized, the terminal equipment may use a higher transmit power already in the call-establishment stage when it transmits access burst, thus making sure that the call is established as soon as possible. When the call has been established, the base station continuously transmits information about the required transmit power to the terminal equipment.

The power control procedures of the mobile stations controlled by the base stations employ two different methods. In the first method, the power control is based on the mobile station informing the base station of the transmit power it is using, and the base station in turn signaling to the mobile station the absolute value of the transmit power required in each case. Such a method is used for example in the GSM system.

In the second power control method, the base station monitors the power received from the mobile station, compares this power with a reference value, and transmits a command to the mobile station to either increase or decrease the transmit power. Such a method is used in some CMDA systems.

According to a preferred embodiment of the invention, during the establishment of the call the mobile station signals to the base station that it has a higher priority than the other mobile stations. The base station thus takes into account the priority of the call when it transmits power control commands. When the base station transmits a power control message to the prioritized connection, it may add, if necessary, for example some constant value to the power value counted for a normal connection. This embodiment is applicable especially in connection with a power control procedure employing a reference value.

When the invention is applied in a CDMA system, a mobile station with a high priority may insure a successful start for the call by transmitting the call set-up message with a higher transmit power than a mobile station with a normal priority would. CMDA systems generally employ so-called open loop power control. The mobile station monitors the power level of the signal received from the base station, and adjusts its own transmit power on the basis of this power level. In the arrangement according to the invention, a mobile station with a high priority may add some constant value to the transmit power value indicated by the open loop measurement. When a call is established, the mobile station signals its priority level to the base station according to the above-described preferred embodiment. During the call, the base station monitors the power of the signal received from the mobile station in the same way it monitors the power over other connections, and if the quality of the call drops below a predetermined threshold, the base station may allow, if necessary, a higher transmit power for the high priority call than it would allow for a normal call. With this procedure it is possible to prevent the disconnection of the call, but on the other hand a transmit power exceeding the normal power is not used unnecessarily when the quality of the connection does not demand it.

According to another preferred embodiment of the invention, the base station does not have to know that the call is different from a normal call. This method is applicable in connection with a power control method using absolute values. The terminal equipment may for example signal to the base station such a value of the transmit power it is using that is smaller than in reality. Thus, in a prioritized call the mobile station could transmit with a higher power than what the power control commands transmitted by the base station for a normal-priority call require. Thus, the quality of the connection of the prioritized call is better than that of the other calls of the cell.

In cellular network systems, such as the GSM, using TDMA multiple access methods, the method according to the invention can be applied especially in connection with a call set-up message. Call establishment is performed in the present systems by means of a random access channel. A terminal equipment wanting to establish a connection with the base station transmits a call set-up message on a channel, shared by all terminal equipments and reserved for this purpose, that the base station listens to. The channel has no special frame structure, but the terminal equipments transmit a message at random instants. Messages accidentally overlapping either entirely or partly are generally destroyed, since the base station cannot distinguish these messages from each other. In the method according to the invention, when the terminal equipment starts a call with a high priority, it transmits the call set-up message with a higher transmit power than what is used for a normal call. Thus, the message is more likely received reliably at the base station, and the call can be established faster and more surely.

Even though the invention is described above with reference to the examples according to the accompanying drawing, it is clear that the invention is not restricted thereto, but it can be modified in many ways within the inventive idea disclosed in the appended claims.

We claim:

1. A method for transmitting calls of different priorities in a cellular network which comprises in each cell at least one base station communicating with subscriber terminals within its area, and in which network the base station transmits power control information messages to the subscriber terminals, which can adjust their transmit power on the basis of the power control information messages from the base station, the calls of the network having different levels of priority, the method comprising:

a subscriber terminal signaling to the base station that it has a high priority for a call; and the base station taking into account the priority of the call when it transmits power control information messages, wherein calls with a high priority use a higher transmit power than what is allowed for calls with a lower priority, wherein, when a call set-up message for a prioritized call is transmitted, a higher transmit power is used than in other calls, and wherein the level of the transmit power used in the prioritized call depends on the power control information messages transmitted by the base station and on the traffic load of the cell.

2. The method according to claim 1, wherein the power control information messages transmitted by the base station to the subscriber terminals take into account the priority level of the call in such a way that a higher transmit power is used in calls with a high priority than in calls with a lower priority in similar circumstances.

3. The method according to claim 1, further comprising:

a subscriber terminal signaling to the base station a value differing from the real value of the transmit power it uses in a call with a higher priority, the base station transmitting a power control command to the subscriber terminal on the basis of this differing value, and the subscriber terminal using a higher transmit power than the power control command transmitted by the base station to the subscriber terminal indicates.

4. The method according to claim 1, wherein, when a call set-up message for a prioritized call is transmitted, the transmit power value indicated by an open loop power control is used, said power value being increased by a determined constant value.

5. The method according to claim 1, wherein, when a call is established, a particular subscriber terminal signals to the base station that it will start a prioritized call.

6. The method according to claim 5, wherein if the power of the signal received by the base station from the particular subscriber terminal drops below a predetermined threshold, a higher transmit power is used in the prioritized call than in the other calls.

7. The method according to claim 1, wherein the level of the transmit power used in the prioritized call depends on the level of priority of the call.

8. The method according to claim 1, wherein the transmit power used in the prioritized call varies during the call.

9. The method according to claim 1, wherein the cellular network employs a CDMA multiple access method.

\* \* \* \* \*

UNITED STATES PATENT AND TRADEMARK OFFICE
CERTIFICATE OF CORRECTION

PATENT NO. : 5,930,684
DATED : July 27, 1999
INVENTOR(S) : Keskitalo, et. al.

It is certified that error appears in the above-identified patent and that said Letters Patent is hereby corrected as shown below:

In column 1, line "[22]", please change the date from "Feb. 17, 1996" to --Feb. 17, 1995--.

Signed and Sealed this

Eleventh Day of January, 2000

Attest:

Q. TODD DICKINSON

*Attesting Officer*     *Acting Commissioner of Patents and Trademarks*